(12) United States Patent
Maruno et al.

(10) Patent No.: US 8,786,997 B2
(45) Date of Patent: Jul. 22, 2014

(54) NON-EXCITED OPERATION TYPE ELECTROMAGNETIC BRAKE CONTROL DEVICE AND METHOD

(75) Inventors: Masaharu Maruno, Fukuoka (JP); Daisuke Matsuo, Fukuoka (JP); Kazuho Furukawa, Yamanashi (JP)

(73) Assignee: Kito Corporation, Yamanashi (JP)

( * ) Notice: Subject to any disclaimer, the term of this patent is extended or adjusted under 35 U.S.C. 154(b) by 130 days.

(21) Appl. No.: 13/498,105

(22) PCT Filed: Sep. 29, 2010

(86) PCT No.: PCT/JP2010/067493
§ 371 (c)(1),
(2), (4) Date: Mar. 23, 2012

(87) PCT Pub. No.: WO2011/040637
PCT Pub. Date: Apr. 7, 2011

(65) Prior Publication Data
US 2012/0268856 A1 Oct. 25, 2012

(30) Foreign Application Priority Data
Sep. 30, 2009 (JP) ................................. 2009-228554

(51) Int. Cl.
*H02K 49/00* (2006.01)
(52) U.S. Cl.
USPC ........................................................ 361/152
(58) Field of Classification Search
CPC ........... B60T 8/36; B60T 8/363; B60T 17/22; B60T 7/12; B60T 8/3615; B60T 8/362; B60T 8/366; B60T 8/4275; B60T 8/885
USPC ........................................................ 361/152
See application file for complete search history.

(56) References Cited

U.S. PATENT DOCUMENTS

| 4,516,038 A | * | 5/1985 | Glennon | ....................... 327/113 |
| 7,949,443 B2 | * | 5/2011 | Lin et al. | .......................... 701/22 |

FOREIGN PATENT DOCUMENTS

| JP | 61-3058 | | 1/1986 |
| JP | 2-203030 | | 8/1990 |
| JP | 6-61467 | | 8/1994 |
| JP | 2008-131759 | | 6/2008 |
| JP | 2009014196 A | * | 1/2009 ............. H02P 15/00 |

OTHER PUBLICATIONS

International Search Report, correspodning to PCT/JP2010/067493, dated Jan. 18, 2001, 4 pages.

* cited by examiner

*Primary Examiner* — Rexford Barnie
*Assistant Examiner* — Angela Brooks
(74) *Attorney, Agent, or Firm* — Christie, Parker & Hale, LLP.

(57) ABSTRACT

A non-excited operation type electromagnetic brake control device and method which are free from vibration noise and frequent switching when reducing average current which flows through a brake coil in a holding state of a non-excited operation type electromagnetic brake are provided. An acute triangle voltage wave generation unit generates a stepped acute triangle voltage wave which is formed by valley parts with a first angle and peak parts with a second angle smaller than the first angle arranged alternatively. A comparative voltage wave generation unit generates a comparative voltage wave based on current which flows through the brake coil. A comparison unit compares the acute the triangle voltage wave with the comparative voltage wave when the non-excited operation type electromagnetic brake is in the holding state. A switch performs switching to supply current to the brake coil when the acute triangle voltage wave is larger than the comparative voltage wave and to cut off the supply of current to the brake coil when the acute triangle voltage wave is not larger than the comparative voltage wave.

2 Claims, 7 Drawing Sheets

NON-EXCITED OPERATION TYPE ELECTROMAGNETIC BRAKE CONTROL DEVICE AND METHOD

CROSS-REFERENCE TO RELATED APPLICATION

This application is a National Phase Patent Application and claims the priority of International Application Number PCT/JP2010/067493, filed on Sep. 29, 2010, which claims priority of Japanese Patent Application Number 2009-228554, filed on Sep. 30, 2009.

TECHNICAL FIELD

The present invention relates to a non-excited operation type electromagnetic brake control device and method which control a non-excited operation type electromagnetic brake, which is used in a hoist etc. which has an induction motor, to make the non-excited operation type brake an engaged state, a disengaged state, or a holding state.

BACKGROUND ART

Conventionally, a non-excited operation type electromagnetic brake control device which controls a non-excited operation type electromagnetic brake to make the non-excited operation type electromagnetic brake an engaged state, a disengaged state, or a holding state has been proposed (for example, Patent Document 1). Under the control of a non-excited operation type electromagnetic brake, in the non-excited state in which the brake is set to the engaged state, a movable core is pushed by spring force, and frictional force which is generated between the movable core and a brake disk and between the brake disk and an anti-movable core generates brake torque. Further, in the excited state in which the brake is set to the disengaged state, the movable core is attracted to a fixed core by magnetic attraction force and thus the brake disk becomes a free state and the brake torque disappears. When attracting the movable core to the fixed core to switch the brake to the disengaged state, a large power is necessary, but the power for holding the movable core in the attracted state after attracting the movable core to the fixed core, that is, the power for switching the brake to the holding state after switching the brake to the disengaged state, may be less than the power which is required when disengaging the brake.

FIG. 6 is a circuit diagram of a conventional non-excited operation type electromagnetic brake control device. The non-excited operation type electromagnetic brake control device 1 shown in FIG. 6 has an AC power supply 2, a brake coil 3, a triangle voltage wave generation unit 4, a comparative voltage wave generation unit 5, a comparison unit 6, switches 7, 8, a control power supply unit 9, and diodes 10, 11.

The brake coil 3 generates a magnetic attraction force by supplying current I from the AC power supply 2 when the switch 8 is turned on due to an instruction from the outside, and switches the non-excited operation type electromagnetic brake (not shown) from the engaged state to the disengaged state. At this time, the current I flows from the brake coil 3 to the anode side of the diode 11. Further, at the same time as when the switch 8 is turned on, a timer (38) starts a measurement. The elapse of a predetermined time after the switch 8 is turned on is measured by the timer (38). When a certain time elapses, the non-excited operation type electromagnetic brake (not shown) is switched from the disengaged state to the holding state.

The triangle voltage wave generation circuit 4 generates a triangle voltage wave comprised of valley parts and peak parts, each of which has the same angle as an angle of each of the valley parts, arranged alternately. For this reason, the triangle voltage wave generation circuit 4, as shown in FIG. 7, has a comparator 21, a CR part 22 which is connected to a non-inverted input part of the comparator 21, a resistance part 23 which is connected to an input part of the triangle voltage wave generation circuit 4, and a resistance 24 with one end which is connected to an output part of the triangle voltage wave generation circuit 4 and an inverted input part of the comparator 21 and with the other end which is connected to an output side of the comparator 21 and the resistance part 23.

The CR part 22 has a resistance 25 with one end which is connected to the non-inverted input side of the comparator 21 and with the other end which is grounded, a capacitor 26 which is connected in parallel to the resistance 25, and a capacitor 27 with one end which is connected to the inverted input side of the comparator 21 and with the other end which is connected to the other end of the resistance 25. The resistance part 23 has a resistance 28 with one end which is connected to the input part of the triangle voltage wave generation circuit 4 and with the other end which is connected to the non-inverted input side of the comparator 21, a resistance 29 with one end which is connected to the input part of the triangle voltage wave generation circuit 4 and with the other end which is connected to the output side of the comparator 21, and a resistance 30 with one end which is connected to the other end of the resistance 28 and with the other end which is connected to the other end of the resistance 29.

When the capacitor 27 is not charged, the potential of the non-inverted input side of the comparator 21 is higher than the potential of the inverted input side of the comparator 21, so the output of the comparator 21 becomes high. On the other hand, when the capacitor 27 is charged and the potential of the inverted input side of the comparator 21 exceeds the potential of the non-inverted input side of the comparator 21, the output of the comparator 21 becomes low. The charging/discharging time of the capacitor 27 is determined by the CR value of the CR part 22 and the resistance value of the resistance part 23.

The comparative voltage wave generation unit 5 generates a comparative voltage wave based on the current I. For this reason, the comparative voltage wave generation unit 5 has a shunt resistance 31 which detects the current I and converts the detected current I to voltage to generate the comparative voltage wave.

The comparison unit 6 compares the triangle voltage wave value with the comparative voltage wave value when the non-excited operation type electromagnetic brake (not shown) is in the holding state. For this reason, the comparison unit 6 has a comparator 32 and a switching part 33 comprised of an npn type transistor whose gate is connected to the output side of the comparator 32 and a pnp transistor whose gate is connected to the output side of the comparator 32.

The switch 7 as a switching unit performs switching to supply current I to the brake coil 3 when the triangle voltage wave value is larger than the comparative voltage wave value and to cut off the supply of current I to the brake coil 3 when the triangle voltage wave value is not lager than the comparative voltage wave value, and reduces the average current which flows through the brake coil 3 when the non-excited operation type electromagnetic brake (not shown) is in the holding state. For this reason, the switch 7 is comprised of IGBT (insulated gate bipolar transistors), Darlington transistors, thyristors, Triac's®, or other semiconductor devices.

The control power supply unit 9 supplies power for starting up the comparator 32, turning the switch 7 on/off, etc. For this reason, the control power supply unit 9 has a control power supply 34, a rectifier unit 35 which is comprised of four diodes, a resistance 36 which is connected between one end of the control power supply 34 and one end of the rectifier unit 35, and a transformer 37 which is connected to the rectifier unit 35.

FIG. 8 is a graph which shows time change of current which flows through a brake coil of the non-excited operation type electromagnetic brake control device of FIG. 6. During the time t1 when the non-excited operation type electromagnetic brake (not shown) is in the disengaged state, the brake coil 3 is continuously supplied with current I1 from the AC power supply 2. As opposed to this, during the time t2 when the non-excited operation type electromagnetic brake (not shown) is in the holding state, as explained later, the switch 7 is used to switch between the continuation of the supply of the current to the brake coil 3 and the cutoff of the supply of the current to the brake coil 3 every carrier period of the triangle voltage wave. Therefore, the average current I2 which flows through the brake coil during the time t2 is smaller than the current I1 which flows through the brake coil during the time t1.

FIG. 9 is a graph which shows time change of the triangle voltage wave and the comparative voltage wave which are generated in the non-excited operation type electromagnetic brake control device of FIG. 6. While the non-excited operation type electromagnetic brake (not shown) is in the disengaged state, the capacitors 26, 27 of the triangle voltage wave generation unit 4 are charged and control voltage is generated by the control power supply unit 9 for raising the comparative voltage wave. On the other hand, when the non-excited operation type electromagnetic brake (not shown) is in the holding state, the control voltage from the control power supply unit 9 falls, the comparative voltage wave is lowered, and the comparison unit 6 compares the comparative voltage wave with the triangle voltage wave. During the time ONduty when the triangle voltage wave is higher than the comparative voltage wave in one carrier period T of the triangle voltage wave, the transistor 7 is turned on, while during the time OFFduty when the triangle voltage wave is not higher than the comparative voltage wave in one carrier period T of the triangle voltage wave, the transistor 7 is turned off.

In this way, in the holding state of the non-excited operation type electromagnetic brake, when the triangle voltage wave value is larger than the comparative voltage wave value, the switch 7 is turned on and current I is supplied to the brake coil 3, on the other hand, when the triangle voltage wave value is not longer than the comparative voltage wave value, the switch 7 is turned off and the supply of current I to the brake coil 3 is cut off to thereby reduce the average current which flows through the brake coil 3.

PRIOR ART DOCUMENTS

Patent Documents

Patent Document 1: Japanese Unexamined Patent Publication (Kokai) No. 2009-14196A

SUMMARY OF THE INVENTION

Problem to Be Solved by the Invention

When the carrier frequency of the triangle voltage wave which is generated by the non-excited operation type electromagnetic brake control device which is shown in FIG. 6 is low (for example, 3 kHz or less), there is the problem that vibration noise occurs. Therefore, it is necessary to set the carrier frequency of the triangle voltage wave to a predetermined value or more (for example, 4 kHz or more).

When increasing the carrier frequency, by forming a high precision comparative voltage wave to shorten the time the triangle voltage wave is higher than the comparative voltage wave, it is possible to reduce the ratio of the time ONduty to the time OFFduty in the carrier period T of the triangle voltage wave, shorten the time when the transistor 7 is turned on, and further reduce the average current which flows through the brake coil 3. However, as the carrier frequency of the triangle voltage wave gets higher, switching of the transistor 7 occurs frequently, so the semiconductor device forming the transistor 7 tends to be damaged.

An object of the present invention is to provide a non-excited operation type electromagnetic brake control device and method which can further reduce the average current which flows through the brake coil without causing vibration noise and frequent switching in the holding state of the non-excited operation type electromagnetic brake.

Means for Solving the Problem

The non-excited operation type electromagnetic brake control device according to the present invention is a non-excited operation type electromagnetic brake control device which controls a non-excited operation type electromagnetic brake to make the non-excited operation type electromagnetic brake an engaged state, a disengaged state, or a holding state, comprising: a brake coil which generates magnetic attraction force to switch the non-excited operation type electromagnetic brake from the engaged state to the disengaged state; an acute triangle voltage wave generation unit which generates a stepped acute triangle voltage wave which is comprised of valley parts, each of which has a first angle and peak parts, each of which has a second angle smaller than the first angle, arranged alternately; a comparative voltage wave generation unit which generates a comparative voltage wave based on current which flows through the brake coil; a comparison unit which compares the acute triangle voltage wave value with the comparative voltage wave value when the non-excited operation type electromagnetic brake is in the holding state; and a switching unit which performs switching to supply current to the brake coil when the comparison unit judges that the acute triangle voltage wave value is larger than the comparative voltage wave value and to cut off the supply of current to the brake coil when the comparison unit judges that the acute triangle voltage wave value is not longer than the comparative voltage wave value.

The non-excited operation type electromagnetic brake control method according to the present invention is a non-excited operation type electromagnetic brake control method which controls a non-excited operation type electromagnetic brake to make the non-excited operation type electromagnetic brake an engaged state, a disengaged state, or a holding state, comprising steps of: generating magnetic attraction force in a brake coil to switch the non-excited operation type electromagnetic brake from the engaged state to the disengaged state; generating a stepped acute triangle voltage wave which is comprised of valley parts, each of which has a first angle and peak parts, each of which has a second angle smaller than the first angle, arranged alternatel; generating a comparative voltage wave based on current which flows through the brake coil; comparing the acute triangle voltage wave value with the comparative voltage wave value when the non-excited operation type electromagnetic brake is in the holding state; and performing switching to supply current to the brake coil when the comparison unit judges that the acute triangle voltage wave value is larger than the comparative voltage wave value and to cut off the supply of current to the brake coil when the comparison unit judges that the acute triangle voltage wave value is not larger than the comparative voltage wave value.

According to the present invention, it is possible to further reduce the average current which flows through the brake coil without causing vibration noise and frequent switching in the holding state of the non-excited operation type electromagnetic brake.

EMBODIMENTS FOR CARRYING OUT THE INVENTION

Figure 1:
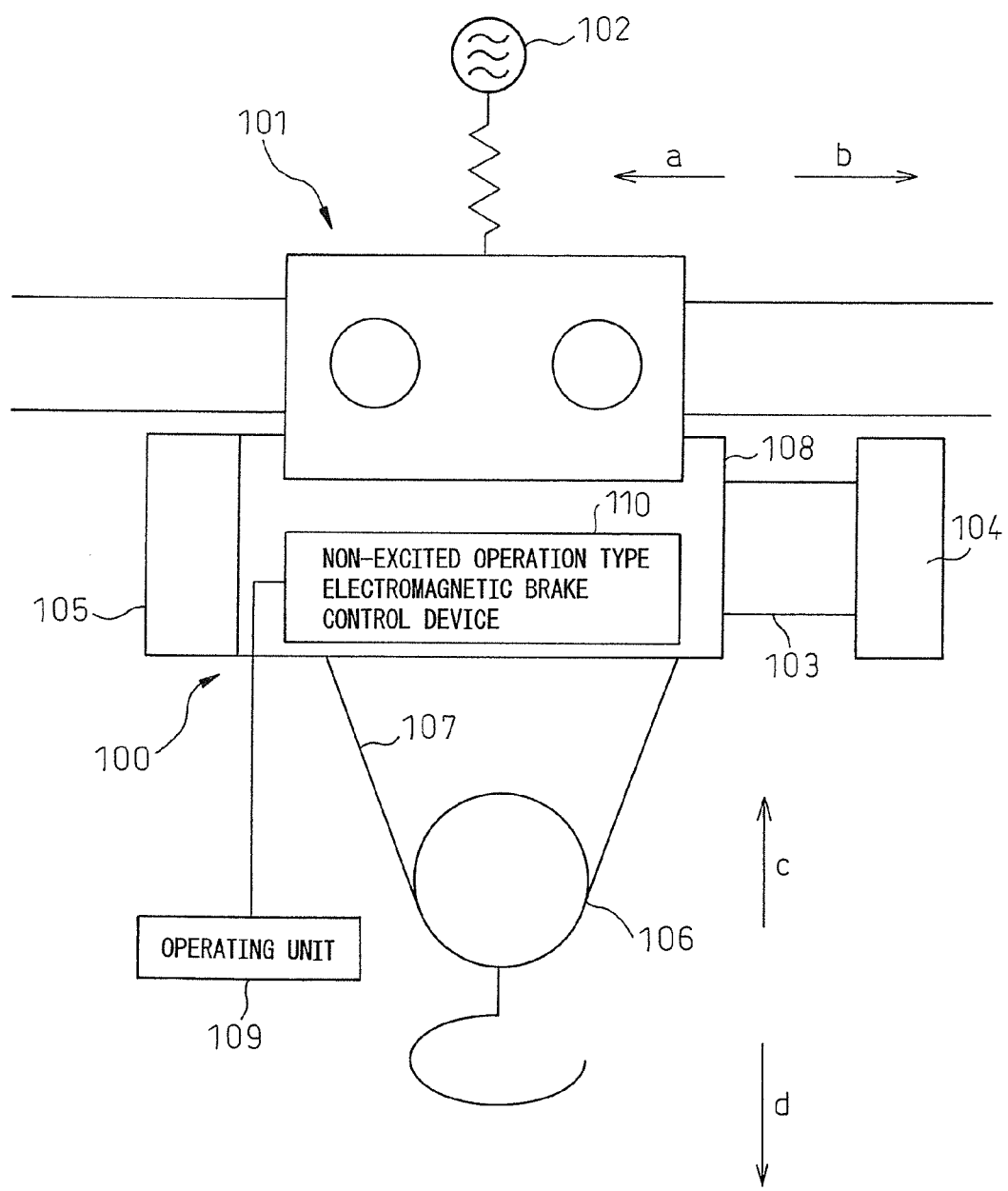
FIG. 1 is a schematic view of a hoist in which a non-excited operation type electromagnetic brake control device according to the present invention is used.

Embodiments of the non-excited operation type electromagnetic brake control device and method according to the present invention will be explained in detail while referring to the drawings. Note that, in the figures, the same component elements are denoted by the same reference numerals.

FIG. 1 is a schematic view of a hoist in which a non-excited operation type electromagnetic brake control device according to the present invention is used. In FIG. 1, the hoist 100 is attached to a hoist traverse mechanism 101 which can move in the arrow "a" or "b" direction and is supplied with power from a power supply 102 such as a three-phase power supply.

The hoist 100 has an induction motor 103 which performs lifting in the arrow "c" direction or lowering in the arrow "d" direction (rotation), a non-excited operation type electromagnetic brake 104 which brakes the induction motor 103, a speed reducer 105 which amplifies torque generated in the induction motor 103, a hook 106 to which a workpiece can be attached, a wire rope 107 which is connected to the hook, and a drum 108 which lifts or lowers the wire rope 107 by a speed reducer 105 which amplifies the torque. Further, the hoist 100 is provided with a non-excited operation type electromagnetic brake control device 110 which controls the non-excited operation type electromagnetic brake 104 to make the non-excited operation type electromagnetic brake 104 a engaged state, a disengaged state, or a holding state in accordance with operation of an operating unit 109.

Figure 2:
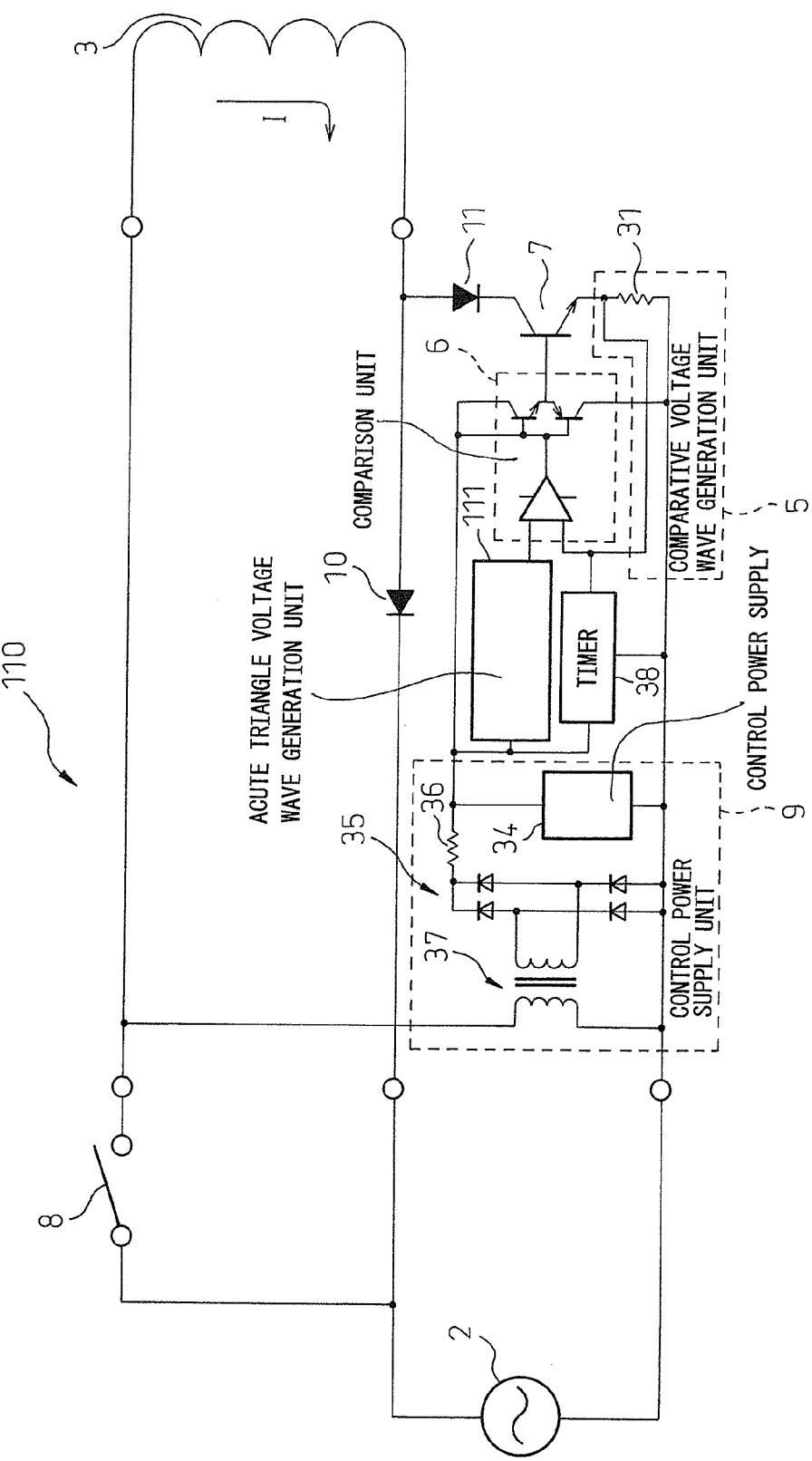
FIG. 2 is a circuit diagram of a non-excited operation type electromagnetic brake control device according to the present invention.

FIG. 2 is a circuit diagram of a non-excited operation type electromagnetic brake control device according to the present invention. The non-excited operation type electromagnetic brake control device 110 shown in FIG. 2 has an AC power supply 2, a brake coil 3, an acute triangle voltage wave generation unit 111, a comparative voltage wave generation unit 5, a comparison unit 6, switches 7, 8, a control power supply 9, and diodes 10, 11.

Figure 3:
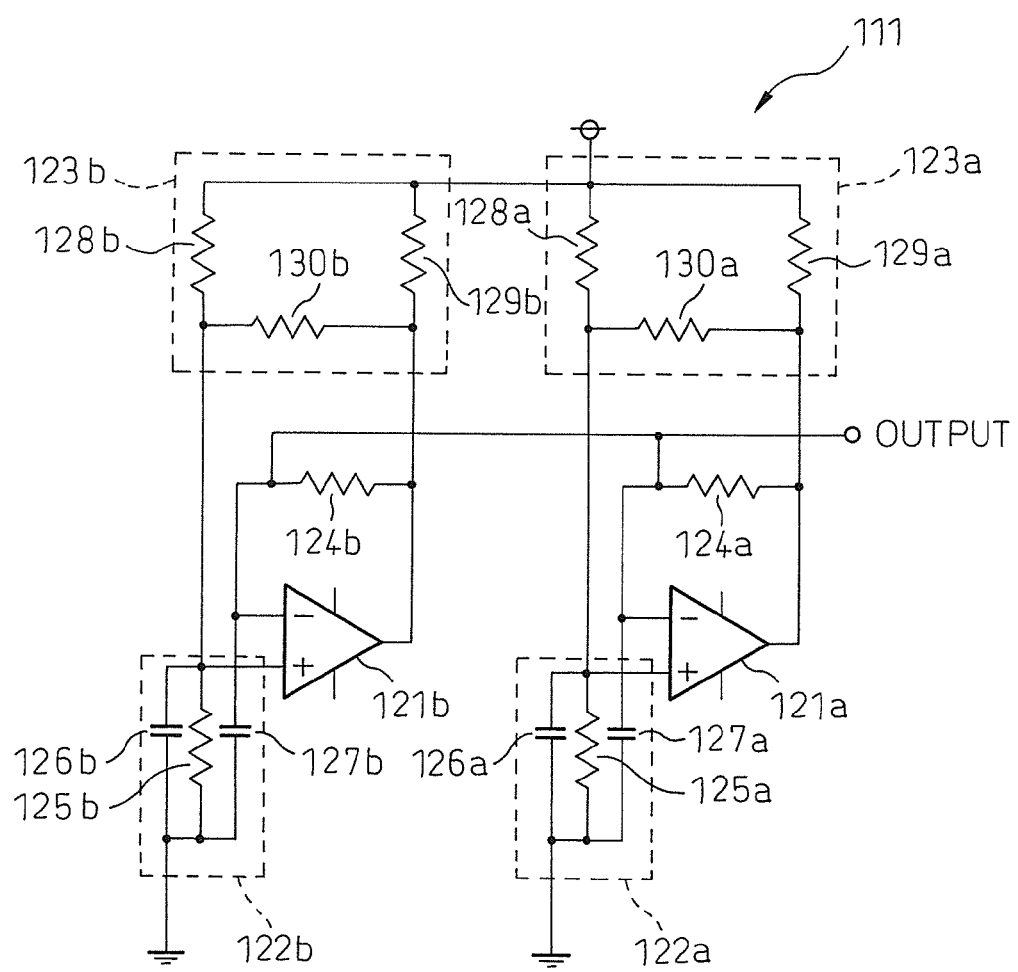
FIG. 3 is a circuit diagram of an acute triangle voltage wave generation unit which is used in the non-excited operation type electromagnetic brake control device of FIG. 2.

The acute triangle voltage wave generation circuit 111 generates a stepped acute triangle voltage wave which is comprised of valley parts, each of which has a first angle and peak parts, each of which has a second angle smaller than the first angle, arranged alternatively. For this reason, the acute triangle voltage wave generation circuit 111, as shown in FIG. 3, has comparators 121a, 121b, CR parts 122a, 122b which are connected to non-inverted input parts of the comparators 121a, 121b, respectively, resistance parts 123a, 123b which are connected to an input part of the acute triangle voltage wave generation circuit 111, and resistances 124a, 124b with first ends connected to an output part of the acute triangle voltage wave generation circuit 111 and inverted input parts of the comparators 121a, 121b, respectively, and with second ends connected to output sides of the comparators 121a, 121b and the resistance parts 123a, 123b, respectively.

The CR part 122a has a resistance 125a with one end connected to the non-inverted input side of the comparator 121a and with the other end which is grounded, a capacitor 126a which is connected in parallel to the resistance 125a, and a capacitor 127a with one end connected to the inverted input side of the comparator 121a and with the other end connected to the other end of the resistance 125a. The resistance part 123a has a resistance 128a with one end connected to the input part of the acute triangle voltage wave generation circuit 111 and with the other end connected to the non-inverted input side of the comparator 121a, a resistance 129a with one end connected to the input part of the acute triangle voltage wave generation circuit 111 and with the other end connected to the output side of the comparator 121a, and a resistance 130a with one end connected to the other end of the resistance 128a and with the other end connected to the other end of the resistance 129a.

The CR part 122b has a resistance 125b with one end which is connected to the non-inverted input side of the comparator 121b and with the other end which is grounded, a capacitor 126b which is connected in parallel to the resistance 125b, and a capacitor 127b with one end which is connected to the inverted input side of the comparator 121b and with the other end connected to the other end of the resistance 125b. The resistance part 123b has a resistance 128b with one end which is connected to the input part of the acute triangle voltage wave generation circuit 111 and with the other end connected to the non-inverted input side of the comparator 121b, a resistance 129b with one end which is connected to the input part of the acute triangle voltage wave generation circuit 111 and with the other end which is connected to the output side of the comparator 121b, and a resistance 130b with the other end which is connected to the other end of the resistance 128b and with the other end which is connected to the other end of the resistance 129b.

When the capacitor 127a is not charged, the potential of the non-inverted input side of the comparator 121a is higher than the potential of the inverted input side of the comparator 121a, so the output of the comparator 121a becomes high. On the other hand, when the capacitor 127a is charged and the potential of the inverted input side of the comparator 121a exceeds the potential of the non-inverted input side of the comparator 121a, the output of the comparator 121a becomes low. The charging/discharging time of the capacitor 127a is determined by the CR value of the CR part 122a and the resistance value of resistance part 123a.

Similarly, when the capacitor 127b is not charged, the potential of the non-inverted input side of the comparator 121b is higher than the potential of the inverted input side of the comparator 121b, so the output of the comparator 121b becomes high. On the other hand, the capacitor 127b is charged. When the potential of the inverted input side of the comparator 121b exceeds the potential of the non-inverted input side of the comparator 121b, the output of the comparator 121b becomes low. The charging/discharging time of the capacitor 127b is determined by the CR value of the CR part 122b and the resistance value of resistance part 123b.

In FIG. 3, the resistance value of the resistance part 123a is set to be lower than the resistance value of the resistance part 123b, and the CR value of the CR part 122a is set to be lower than the CR value of the CR part 122b. By setting the resistance value of the resistance parts 123a, 123b and the CR value of the CR parts 122a, 122b in this way, the charging/discharging time of the CR part 122a differs from the charging/discharging time of the CR part 122b. As a result, the valley parts of the triangle voltage wave are generated from the circuit part comprised of the comparator 121a, the CR part 122a, the resistance part 123a and the resistance 124a, and output from the acute triangle voltage wave generation circuit 111, while the peak parts of the triangle voltage wave are generated from the circuit part comprised of the comparator 121b, the CR part 122b, the resistance part 123b and the resistance 124b, and output from the acute triangle voltage wave generation circuit 111. Note that, each of the peak parts of the triangle voltage wave, which are generated from the circuit part comprised of the comparator 121b, the CR part 122b, the resistance part 123b and the resistance 124b, has an angle smaller than an angle of each of the valley parts of the triangle voltage wave, which are generated from the circuit part comprised of the comparator 121a, the CR part 122a, the resistance part 123a and the resistance 124a.

Figure 4:
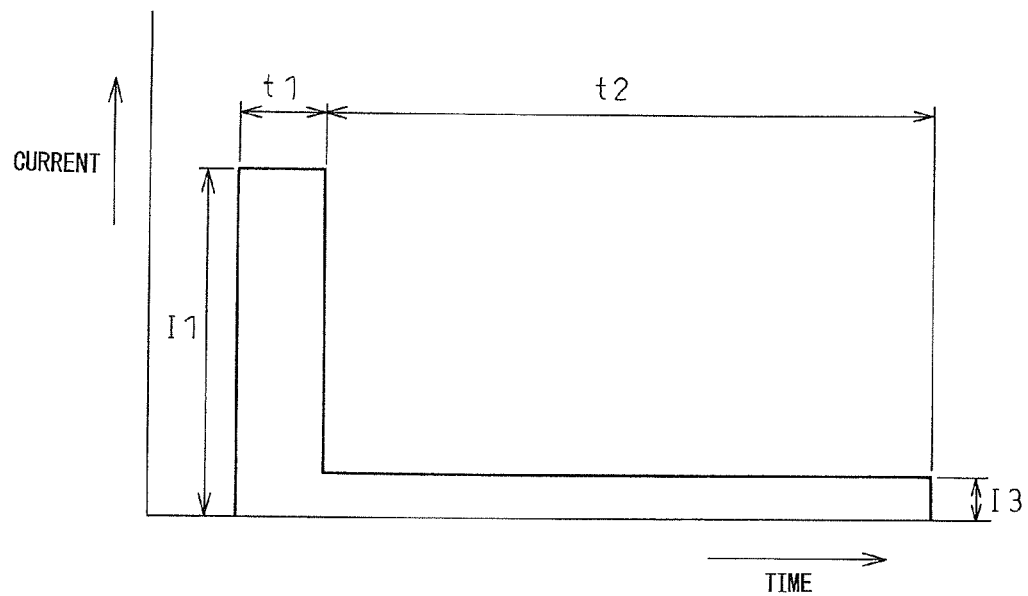
FIG. 4 is a graph which shows time change of current which flows through a brake coil of the non-excited operation type electromagnetic brake control device of FIG. 2.

FIG. 4 is a graph which shows time change of current which flows through a brake coil of the non-excited operation type electromagnetic brake control device of FIG. 2. During the time t1 when the non-excited operation type electromagnetic brake (not shown) is in the disengaged state, in the same way as the case of the non-excited operation type electromagnetic brake control device of FIG. 6, the brake coil 3 is continuously supplied with the current I1 from the AC power supply 2. On the other hand, during the time t2 when the non-excited operation type electromagnetic brake (not shown) is in the holding state, average current I3 which flows through the brake coil is smaller than the average current I2, as explained later.

Figure 5:
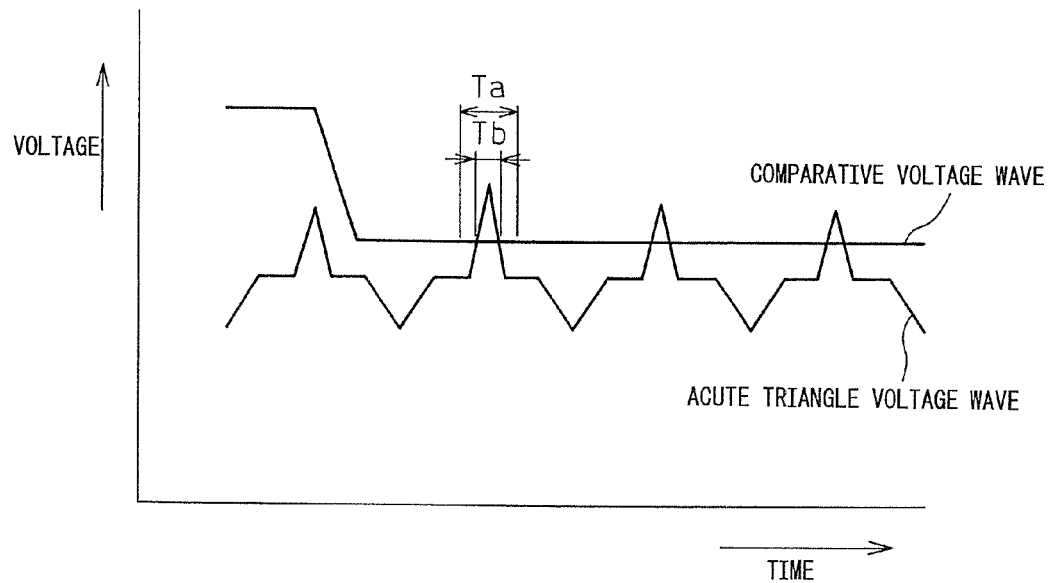
FIG. 5 is a graph which shows time change of triangle voltage wave and comparative voltage wave which are generated in the non-excited operation type electromagnetic brake control device of FIG. 2.

FIG. 5 is a graph which shows time change of triangle voltage wave and comparative voltage wave which are generated in the non-excited operation type electromagnetic brake control device of FIG. 2. While the non-excited operation type electromagnetic brake (not shown) is in the disengaged state, the capacitors 26, 27 of the triangle voltage wave generation unit 4 are charged and the control power supply unit 9 generates the control voltage to raise the comparative voltage wave. On the other hand, when the non-excited operation type electromagnetic brake (not shown) is in the holding state, the control voltage from the control power supply unit 9 falls, the comparative voltage wave is lowered, and the comparison unit 6 compares the comparative voltage wave with the acute triangle voltage wave. During the time ONduty when the triangle voltage wave is higher than the comparative voltage wave in one carrier period T of the triangle voltage wave, the transistor 7 is turned on, on the other hand, during the time OFFduty when the triangle voltage wave is not higher than the comparative voltage wave in one carrier period T of the triangle voltage wave, the transistor 7 is turned off.

Figure 6:
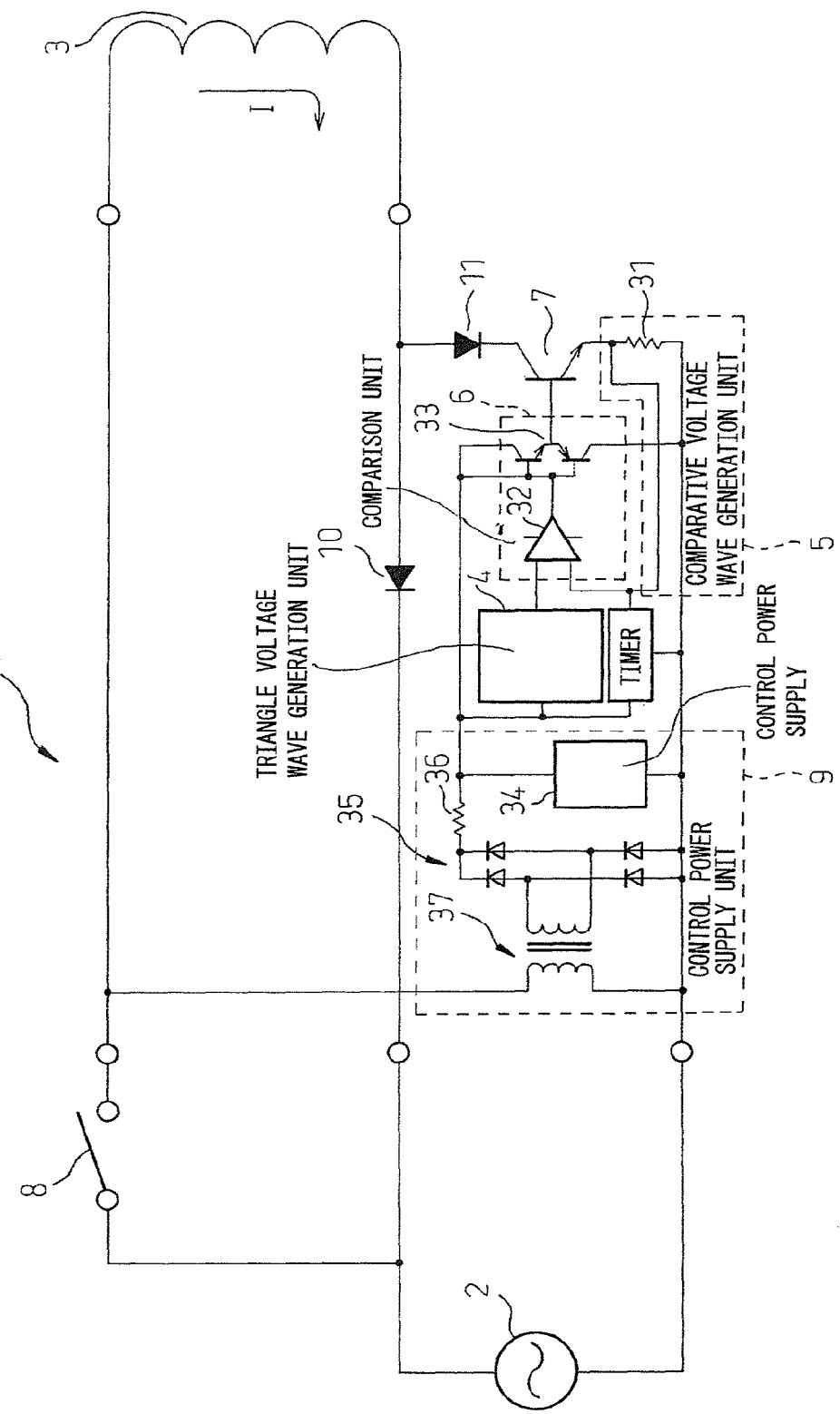
FIG. 6 is a circuit diagram of a conventional non-excited operation type electromagnetic brake control device.
Figure 7:
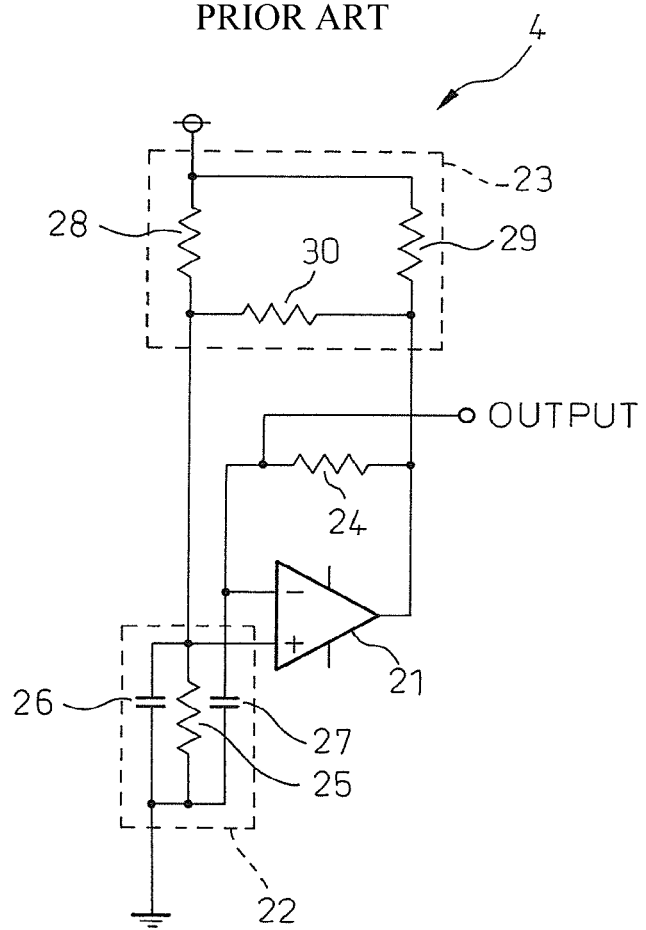
FIG. 7 is a circuit diagram of an acute triangle voltage wave generation unit which is used by the non-excited operation type electromagnetic brake control device of FIG. 6.
Figure 8:
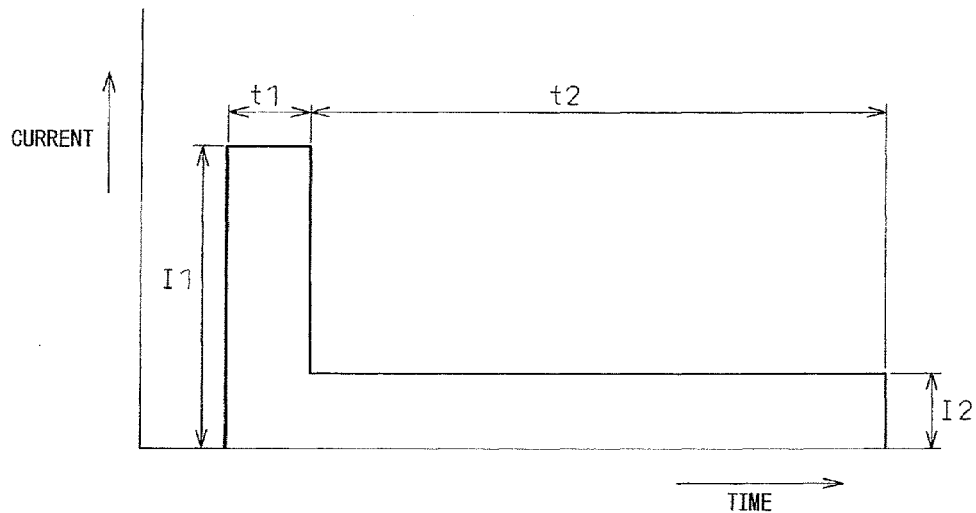
FIG. 8 is a graph which shows time change of current which flows through a brake coil of the non-excited operation type electromagnetic brake control device of FIG. 6.
Figure 9:
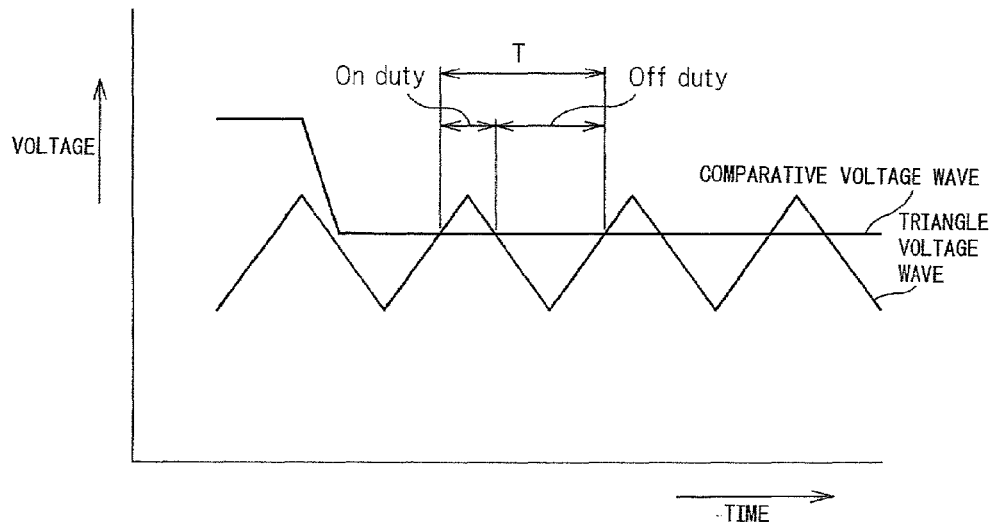
FIG. 9 is a graph which shows time change of triangle voltage wave and comparative voltage wave which are generated in the non-excited operation type electromagnetic brake control device of FIG. 6.

If the acute triangle voltage wave, which is generated by the acute triangle voltage wave generation unit 111, has the same carrier period as the carrier period of the acute triangle voltage wave, which is generated by the triangle voltage wave generation unit 4, the time Tb when the acute triangle voltage wave, which is generated by the acute triangle voltage wave generation unit 111, is higher than the comparative voltage wave is shorter than the time Ta when the triangle voltage wave, which is generated by the triangle voltage wave generation unit 4, is higher than the comparative voltage wave, so the ratio of the time ONduty to the time OFFduty in one carrier period T in the non-excited operation type electromagnetic brake control device of FIG. 2 becomes smaller than the case of the non-excited operation type electromagnetic brake control device of FIG. 6. Therefore, according to the present embodiment, when the non-excited operation type electromagnetic brake (not shown) is in the holding state, it is possible to make the ratio of the time ONduty to the time OFFduty in one carrier period T smaller without changing the carrier frequency, so it is possible to further reduce the average current which flows to the brake coil 3 without vibration noise and frequent switching occurring. That is, the average current I3 becomes smaller than the average current I2. Since frequent switching no longer occurs, it is possible to suppress damage to the switch 7 (semiconductor device) due to frequent switching and miniaturize or eliminate a cooling device such as a fin designed to prevent heat generation due to frequent switching.

Further, by using an acute triangle voltage wave for reducing the ratio of the time ONduty to the time OFFduty in one carrier period T, even if the comparative voltage wave changes due to changes in voltage of the AC power supply 2, automatic feedback is subjected to the comparative voltage wave. As a result, the braking timing of the non-excited operation type electromagnetic brake (not shown) no longer deviates due to the changes in the voltage of the AC power supply 2.

The present invention is not limited to the above embodiments. Various changes and modifications are possible. For example, the case of using a non-excited operation type electromagnetic brake control device according to the present invention in a hoist is explained, but it is possible to use a non-excited operation type electromagnetic brake control device according to the present invention even in other equipment in which a non-excited operation type electromagnetic brake is used.

The invention claimed is:

1. A non-excited operation type electromagnetic brake control device which controls a non-excited operation type electromagnetic brake in an engaged state, a disengaged state, or a holding state, comprising:
a brake coil which generates magnetic attraction force to switch said non-excited operation type electromagnetic brake from the engaged state to the disengaged state;

an acute triangle voltage wave generator configured to generate a stepped acute triangle voltage wave which is comprised of a plurality of valley parts each of which having a first angle, and a plurality of peak parts each of which having a second angle smaller than said first angle, arranged alternately;

a comparative voltage wave generator configured to generate a comparative voltage wave based on current which flows through said brake coil;

a comparator configured to compare a value of said acute triangle voltage wave to a value of said comparative voltage wave when said non-excited operation type electromagnetic brake is in the holding state; and a switch configured to supply current to said brake coil when said comparator judges that said acute triangle voltage wave value is larger than said comparative voltage wave value, and to cut off the supply of current to said brake coil when said comparison unit judges that said acute triangle voltage wave value is not larger than said comparative voltage wave value.

2. A non-excited operation type electromagnetic brake control method which controls a non-excited operation type electromagnetic brake in an engaged state, a disengaged state, or a holding state, the method comprising:

generating magnetic attraction force in a brake coil to switch said non-excited operation type electromagnetic brake from the engaged state to the disengaged state;

generating a stepped acute triangle voltage wave which is comprised of a plurality of valley parts each of which having a first angle, and plurality of peak parts each of which having a second angle smaller than said first angle, arranged alternately;

generating a comparative voltage wave based on the current which flows through said brake coil;

comparing a value of said acute triangle voltage wave to a value of said comparative voltage wave when said non-excited operation type electromagnetic brake is in the holding state; and supplying current to said brake coil when said comparing determines that said acute triangle voltage wave value is larger than said comparative voltage wave value, and cutting off the supply of current to said brake coil when said comparing determines that said acute triangle voltage wave value is not larger than said comparative voltage wave value.

\* \* \* \* \*